(12) United States Patent  
Helm

(10) Patent No.: US 8,920,642 B1  
(45) Date of Patent: Dec. 30, 2014

(54) WASTEWATER TREATMENT UNIT

(71) Applicant: Glenn Helm, Poulsbo, WA (US)

(72) Inventor: Glenn Helm, Poulsbo, WA (US)

(*) Notice: Subject to any disclaimer, the term of this patent is extended or adjusted under 35 U.S.C. 154(b) by 0 days.

(21) Appl. No.: 14/164,869

(22) Filed: Jan. 27, 2014

(51) Int. Cl.
*C02F 3/28* (2006.01)
*B01D 24/26* (2006.01)

(52) U.S. Cl.
CPC ......... *C02F 3/2806* (2013.01); *B01D 2201/316* (2013.01); *B01D 24/266* (2013.01); *C02F 3/2866* (2013.01); *B01D 2201/32* (2013.01); *C02F 3/2826* (2013.01)
USPC ...... 210/150; 210/170.08; 210/254; 210/290; 210/291

(58) Field of Classification Search
CPC ............ C02F 3/06; C02F 3/28; C02F 3/2806; C02F 3/2813; C02F 3/2826; C02F 3/2866; C02F 3/288; B01D 24/007; B01D 24/26; B01D 24/266; B01D 24/386; B01D 2201/316; B01D 2201/32
USPC ............ 210/617, 150, 151, 170.08, 254, 283, 210/290, 291
See application file for complete search history.

(56) References Cited

U.S. PATENT DOCUMENTS

| | | | | |
|---|---|---|---|---|
| 800,187 | A * | 9/1905 | Venable | 210/150 |
| 4,218,318 | A * | 8/1980 | Niimi et al. | 210/150 |
| 4,997,568 | A * | 3/1991 | Vandervelde et al. | 210/150 |
| 5,062,958 | A * | 11/1991 | Bateson et al. | 210/617 |
| 5,281,332 | A * | 1/1994 | Vandervelde et al. | 210/151 |
| 5,350,505 | A * | 9/1994 | Tang | 210/151 |
| 6,540,910 | B2 * | 4/2003 | Schwarzenegger et al. | 210/151 |
| 7,081,203 | B2 * | 7/2006 | Helm | 210/150 |
| 8,029,674 | B2 * | 10/2011 | Lytle | 210/617 |
| 2010/0101994 | A1 * | 4/2010 | Poltorak | 210/497.01 |

* cited by examiner

Primary Examiner — Christopher Upton
(74) Attorney, Agent, or Firm — Michael D. Eisenberg

(57) ABSTRACT

A biological wastewater treatment system is provided comprising a watertight basin and a filter. The basin has an open top and is configured for being placed on a substrate. The filter is located in the basin and includes five layers, each layer configured for removing biological contaminants from water traveling therethough. A first perforated pipe is located in the second layer and is connected to a second perforated pipe located in the fourth layer. If the third layer becomes clogged and prevents the passage of water, the water in the second travels into the first perforated pipe and exits the second perforated pipe in the fourth layer. In this manner, the third layer is bypassed, and the treatment system can be used despite the clogging of the third layer.

20 Claims, 4 Drawing Sheets

WASTEWATER TREATMENT UNIT

TECHNICAL FIELD

The present invention, in some embodiments thereof, relates to wastewater treatment techniques, and in particular, to on-site wastewater treatment via biological processes.

BACKGROUND OF THE INVENTION

Biological wastewater treatment is the process of removing organic and biological contaminants from wastewater via biological processes. Its objective is to produce an environmentally safe fluid waste stream suitable for disposal or reuse.

Biological wastewater treatment may be aerobic (which take place in the presence of oxygen) or anaerobic (which occur in the absence of oxygen). In both processes, a portion of biological contaminants in water (e.g. sugars, fats, organic short-chain carbon molecules, etc.) is digested by bacteria and broken down into simpler components, while another portion is bound into floc.

U.S. Pat. No. 7,081,203, which is incorporated herein by reference and was invented by the inventor of the present invention, discloses a compact, ground surface mounted wastewater treatment unit module. The module is surface mounted on a selected substrate such as a scarified native soil. A watertight receiving basin is located on the substrate. The basin is at least partially filled with a lower layer of packing media, suitable for support of biological growth, and then with at least a first and a final layer of a porous granular media. A standpipe introduces wastewater to be treated, and such wastewater is distributed to the packing at the lower reaches of the basin. The wastewater flows up through the packing, and into the first layer of a porous granular media, and thence upwardly and outwardly via capillary action and molecular attraction, and ultimately though the final porous granular media. Treated wastewater is either collected or absorbed in an absorption foot interface between the final medium and the native earth below.

BRIEF SUMMARY OF EMBODIMENTS OF THE INVENTION

The inventor has found that after the module described in U.S. Pat. No. 7,081,203 is used for a period which varied between 5 and 15 years, floc formed in the first layer of the granular medium clogs the first layer and needs to replaced.

The present invention is aimed at providing a novel biological wastewater treatment system which may be used for a longer period of time. For this purpose, the present invention includes a first layer of coarse (e.g. lumpy) material at the bottom of the basin suitable for support of biological growth. Above the first layer, there are located in ascending order a second coarse layer, a third layer of granular material, a fourth coarse layer, a fifth layer of granular material, and a final layer of granular material. The materials in the second and fourth layers, though coarse, are finer than the material of first layer. The granular material of the final layer is finer that the granular materials of the third and fifth layers. A first pipe is located in the second layer and a second pipe is located in the fourth layer. The first and second pipes are permeable to water and are connected by a connection pipe across the third layer.

Water is introduced in first level and rises through the different layers, where more and more contaminants are removed. After reaching the final layer, water is pure enough to be allowed to enter the native soil.

After a period of use (for example 5 to 15 years), the third layer becomes clogged by the floc formed during the treatment of the water in the first three layers. Thus water cannot flow through the third layer. Instead water in the second layer flows into the first pipe, rises through the connection pipe into the second pipe, and is released in the fourth layer. From the fourth level onward, the water rises and released into the native soil.

The present invention thus enables bypassing the clogged level. In this manner, the wastewater treatment system of the present invention can be used after the third layer is clogged.

Therefore, an aspect of some embodiment of the present invention relates to a biological wastewater treatment system which includes a watertight basin, a filter, a final layer, an exit pipe, a first perforated pipe, a second perforated pipe, and a connection pipe. The watertight basin hays an open top and is configured for being placed on a substrate. The filter is located in the basin and includes five layers. The first layer is located at the bottom of the basin, and includes a plurality of first coarse pieces of a first material having a predetermined surface, which configured for enabling growth of bacteria. The second layer is mounted above the first layer and includes a plurality of second coarse pieces of a second material, the second pieces being smaller than the first pieces. The third layer is mounted above the second layer and comprises a first granular material. The fourth layer is mounted above the third layer and comprises a plurality of third coarse pieces of third material, the third pieces being smaller than the first pieces. The fifth layer is mounted above the fourth layer and comprises a second granular material. The final layer is mounted above the fifth layer, extending upward above the basin and extending laterally outward from the basin and downward toward the substrate, such that a section of the final layer contacts the substrate. The final layer comprises a third granular material which is finer than the first granular material and second granular material. The exit pipe has exit perforations located in the first layer, and is configured for receiving water from an input pipe and for enabling discharge of water into the first layer via the perforations. The first perforated pipe has first perforations located in the second layer, and is configured for receiving water from the second layer via the first perforations. The second perforated pipe has second perforations located in the fourth layer and is configured for enabling discharge of water from the fourth layer via the second perforations. The connection pipe is in fluid communication with the first perforated pipe and second perforated pipe, and enables passage of water from the first connection pipe to the second connection pipe, for bypassing the third layer.

In a variant, the system further comprises a plug located in the connection pipe, the plug having a closed mode and an open mode. The plug is configured for enabling passage of water from the first perforated pipe to the second perforated pipe in the open mode and for preventing passage of water from the first perforated pipe to the second perforated pipe in the closed mode.

In another variant, the first coarse pieces are tubes, each tube being open at both ends of the tube.

Optionally, each tube has a length of 0.5 inches and an outer radius of 0.5 inches.

In another variant, wherein the first material is plastic.

In a further variant, the second coarse pieces of material and the third coarse pieces have substantially equal size.

In yet another variant, the second material is the same as the third material.

In yet a further variant, at least one of the second material and third material is plastic.

In some embodiments of the present invention, the second coarse pieces and/or third coarse pieces are tubes, each tube being open at both ends of the tube.

Optionally, the tubes have an outer diameter of 0.25 inches and a length of 0.25 inches.

In a variant, the second pieces and/or the third pieces comprise gravel particles.

In another variant, the first granular material is the same as the second granular material.

In a further variant, the first granular material and/or the second granular material comprises washed builder's sand.

In yet another variant, the system further comprises a first partition between the first layer and the second layer, the first partition having a net-like structure and being configured for preventing the second pieces from falling into the first layer while enabling passage of water between the first layer and the second layer.

In yet a further variant, the system further comprises at least one of a second partition between the second layer and the third layer and a fourth partition between the fourth layer and the fifth layer. The second partition has a net-like structure and is configured for preventing the first granular material from falling into the second layer while enabling passage of water between the second layer and the third layer. The fourth partition has a net-like structure and is configured for preventing the second granular material from falling into the fourth layer while enabling passage of water between the fourth layer and the fifth layer.

Optionally, the second partition comprises a second fine partition and a second coarse partition. The second fine partition is a flexible grid having fine apertures having a size suitable from preventing the first granular material from falling into the second layer while enabling passage of water between the second layer and the third layer. The second coarse partition is a rigid grid having coarse apertures larger than the fine apertures, the second coarse partition being located below the second fine partition and being configured for supporting the second fine partition and preventing the second fine partition from sagging into the second layer.

Optionally, the third partition comprises a third fine partition and a third coarse partition. The third fine partition is a flexible grid having fine apertures having a size suitable from preventing the second granular material from falling into the fourth layer while enabling passage of water between the fourth layer and the fifth layer. The third coarse partition is a rigid grid having coarse apertures larger than the fine apertures, the third coarse partition being located below the third fine partition and being configured for supporting the third fine partition and preventing the third fine partition from sagging into the fourth layer.

In a variant, the system further comprises a fourth partition between the third layer and the fourth layer, the fourth partition having a net-like structure and being configured for preventing the third pieces from falling into the third layer while enabling passage of water between the third layer and the fourth layer.

In another variant, the system further comprises a standpipe configured for receiving the water from the input pipe and directing the water to the exit pipe, the standpipe protruding out of the final layer.

In yet another variant, the system comprised at least one of a first inspection pipe and a second inspection pipe. The first inspection pipe is joined to the connection pipe and protrudes out of the final layer. The second inspection pipe joined to the second perforated pipe and protruding out of the final layer.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
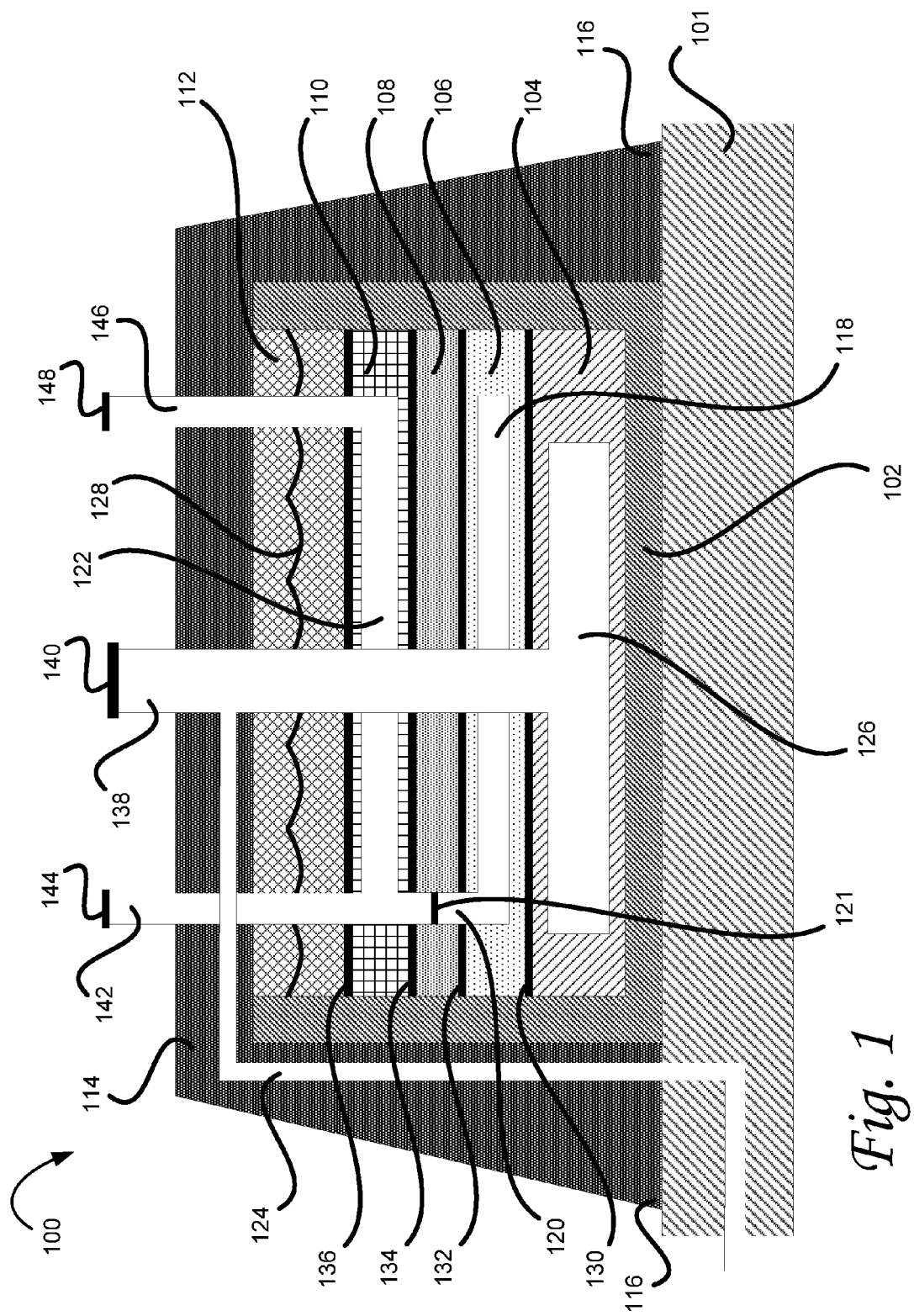
FIG. 1 is a schematic drawing showing a cross-sectional view of a biological wastewater treatment system of the present invention.

FIG. 1 is a schematic drawing showing a cross-sectional view of a biological wastewater treatment system 100 of the present invention.

The system 100 includes a watertight basin 102 placed on a surface of native soil 101. The basin 102 open at the top, which contains a filter having the following layers, from bottom to top: a first layer 104 of coarse material, a second layer 106 of coarse material, a third layer 108 of granular material, a fourth layer 110 of coarse material, and a fifth layer 112 of granular material. The system further includes a top layer 114 of granular material positioned on top of the basin 102 and contacting the fifth layer 112. The top layer 114 extends laterally outwardly from basin 102 to a peripheral edge portion 116 which contacts the native soil 101.

The materials in the second layer 106 and fourth layer 110 are finer (less coarse) than the material in the first layer 102. The granular material in the top layer 114 is finer than the granular materials in the third layer 108 and in the fifth layer 112.

The system 100 also includes a first perforated pipe 118, a connection pipe 120, and a second perforated pipe 122. The first pipe 118 extends at least partially along the second layer 106. The second pipe 122 extends at least partially along the fourth layer 110. The connection pipe 120 is in communication with the first pipe 118 and the second pipe 122, and connects the first and second pipes across the third layer 108. Optionally, a plug 121 is located on the connection pipe. When closed, the plug 121 prevents passage of water from the first perforated pipe 118 and the second perforated pipe 122. When open, the plug 121 enables passage of water from the first perforated pipe 118 and the second perforated pipe 122.

As will be shown below, in the description of FIG. 3, the third layer may become clogged. If this were to happen, a user would open the plug. Thus, water in the second layer would be forced into the first perforated pipe, travel through the connection pipe, reach the second perforated by, and be expelled therefrom into the fourth layer. In this manner, the clogged third layer is bypassed, and the wastewater treatment system is still functional.

The system 100 is configured to biologically treat wastewater from an input pipe 124, which may or may not be part of the system 100. A perforated exit pipe 126 (which may or may not be part of the system 100) is connected and in fluid communication with the input pipe 124. Water from the input pipe 124 is discharged into the exit pipe 126, and is released into the first layer via the perforations of the exit pipe 126.

Water traveling through the input pipe has at least a minimal pressure set so as to force the water to rise within the basin to a desired level. In some embodiments, the water pressure is set to maintain a water level 128 within the fifth layer 112, as will be explained later.

The material of the first layer 104 is composed of coarse pieces of material having at least a predetermined surface upon which bacteria can grow. In some embodiments, the material of the first layer may include a plurality of pieces of plastic having a predetermined surface upon which bacteria can grow. The plastic may be, for example, polyvinylchloride (PVC), though other types of plastic may be used. According to some non-limiting examples, the pieces of material in the first layer include tubes having an outer diameter of about 0.5 inches and a length of about 0.5 inches. In a non-limiting example, thin wall PVC tubes or schedule 40 PVC tubes open at both ends are used. Optionally, the type of plastic is selected to be strong enough to withstand the weight of the upper layers without being crushed.

The material of the second layer 106 is still coarse and made of coarse pieces of material, which are smaller than the pieces of material of the first layer. Thus the material of the second layer is finer than the material in the first layer. The second layer is configured for trapping the larger portions of floc formed by bacteria in the first layer and optionally for enabling further bacterial growth, while enabling passage of water and smaller floc portions upward. For this purpose the distance between the pieces of material cannot be too high. In a non-limiting example, a suitable material used in the second layer is gravel, such as pea gravel, where the pieces of gravel have a large dimension ranging between 0.5 inches and 1.25 inches. In some kinds of pea gravel, $\frac{2}{3}$ of a given volume are taken up by the gravel pieces and about $\frac{1}{3}$ of the given volume is taken up by space between gravel pieces. Additionally or alternatively, the second layer includes a plurality of PVC tubes (such as thin wall PVC tubes, for example), each tube being open at both ends and having an outer diameter of about 0.25 inches and a length of about 0.25 inches.

The material of the third layer 108 is a granular material that is finer than the material of the second layer. The third layer is configured for receiving water from which large floc particles have been removed, and to enable passage of water while trapping smaller floc particles. For this purpose, the size of the particles in the granular material (and consequently the distance between particles) is smaller than the size of the material pieces (and consequently the distance between material pieces) in the material of the second layer. According to a non-limiting example, the material of the third layer may be coarse sand, in which the effective particle size is smaller than 0.80-2.00 mm and a uniformity coefficient smaller than 1.5. An example of a suitable medium that can be used in the third layer is washed builder's sand. In some types of washed builder's sand, $\frac{9}{10}$ of a given volume are taken up by the sand particles and about $\frac{1}{10}$ of the given volume is taken up by space between sand particles.

As was the case with the second layer, the material of the fourth layer 110 is also configured for trapping the larger portions of floc formed by bacteria in the first layer and optionally for enabling further bacterial growth, while enabling passage of water and smaller floc portions upward. Therefore, the properties of the material of the fourth layer are similar to the properties of the material of the second layer. In some embodiments of the present invention, the same material is used in the second and fourth layers.

As was the case with the third layer, the material of the fifth layer 112 is also configured for enabling passage of water while trapping smaller floc particles. Therefore, the properties of the material of the fifth layer are similar to the properties of the material of the third layer. In some embodiments of the present invention, the same material is used in the third and fifth layers.

The final layer 114 is made of a granular material that is finer than the material(s) of the third and fifth layer. The final layer receives water from which smaller floc particles have been removed by the fifth layer, and removes even smaller floc particles from the water. Water passing through the final layer is substantially free of biological contaminants and is released into the native soil 101 without polluting the native soil.

The inventor has performed a BOD5 test on input water and water released into the native soil after being treated in the system 100. The mean biochemical oxygen demand (BOD) of input water after 39 valid measurements was 423 mg/l with a standard deviation of 125 mg/l. The mean biochemical oxygen demand (BOD) of water treated in the system 100 after 47 valid measurements was 6 mg/l with a standard deviation of 7 mg/l. In general, the BOD of water exiting the system 100 was less than 4% of the BOD of the input water. The mean concentration of fecal coliform (FC) bacteria found in the input water after 12 valid measurements was 84682 per 100 ml, while 14 valid measurements yielded a mean fecal coliform (FC) of the water treated in the system 100 of about 38 per 100 ml. Total suspended solids in the water leaving the system 100 is 0 mg/l, as all suspended solids are trapped in the layers of granular material.

The Washington State highs standard for wastewater for septic systems allows for a BOD of 10 mg/l, TSS of 10 mg/l, and FC concentration of 200 per 100 ml. It can clearly be seen that the concentration of biological contaminants in water treated by the system 100 of the present invention is lower than the concentration allowed for in the Washington State standard.

In a preferred embodiment, at least some of the layers are separated by partitions. Each partitions is permeable to water (thus allowing the passage of water between layers), and is configured for preventing material of an upper layer from falling into and mixing with material of a lower layer. This is particularly important when the material of a given layer is finer than the material of its adjacent lower layer. If finer material from a higher layer falls into an adjacent lower layer having coarser material, the space between material pieces may be filled with the fine material. This can lead to the clogging of the coarser layer, as the coarser layer would not be able to remove the larger particles of floc.

Thus, a first partition 130 separates the first layer 104 from the second layer 106. A second partition 132 separates the second layer 106 from the third layer 108. A third partition 134 separates the third layer 108 from the fourth layer 110. A fourth partition 136 separates the fourth layer 110 from the fifth layer 112.

In some embodiments of the present invention, the input pipe 124 and the perforated exit pipe 126 may be connected via a standpipe 138. Thus the water from the input pipe traverses the standpipe 138 to reach the perforated exit pipe 126. The standpipe 138 may or may not be vertical. The standpipe 138 may protrude out of the final layer 114, to enable maintenance of the system as well as inspection of the wastewater before the wastewater is biologically treated. In some embodiments, a cap 140 covers the upper end of the standpipe 138, to prevent odors and to prevent external agents (e.g., rain, dust) from entering the standpipe and further contaminating the wastewater. The cap may be openable by a user, to enable the user to access the internal volume of the standpipe 138, for example for maintenance and inspection.

In some embodiments of the present invention, a first inspection pipe 142 is joined to the connection pipe 120. The first inspection pipe protrudes out of the final layer, enabling a user to perform maintenance work and inspection on the connection pipe and/or on the first perforated pipe 118. The first inspection allows the user to access the plug 121, and to open or close the plug, as needed. A second cap 144 may be provided to close the upper end of the first inspection pipe 142.

In some embodiments of the present invention, a second inspection pipe 146 is joined to the second perforated pipe 122. The second inspection pipe protrudes out of the final layer, enabling a user to perform maintenance work and inspection on the second perforated pipe. A third cap 148 may be provided to close the upper end of the second inspection pipe 146.

The maintenance via the second inspection pipe may include pouring hot water and/or desired chemicals for dissolving floc in the third layer 110. To do this, water is pumped out of the system 100 to a level which is below the third layer 110. Hot water and/or chemicals are poured into the second inspection pipe 146 and travel to the second perforated pipe 122, to exit from the perforations of the second perforated pipe 122 and flow downward to the third layer 110. The hot water and/or chemicals dissolve the floc and thereby unclog the third layer 110. The hot water and/or chemicals and the dissolved floc are pumped out of the system.

Figure 2:
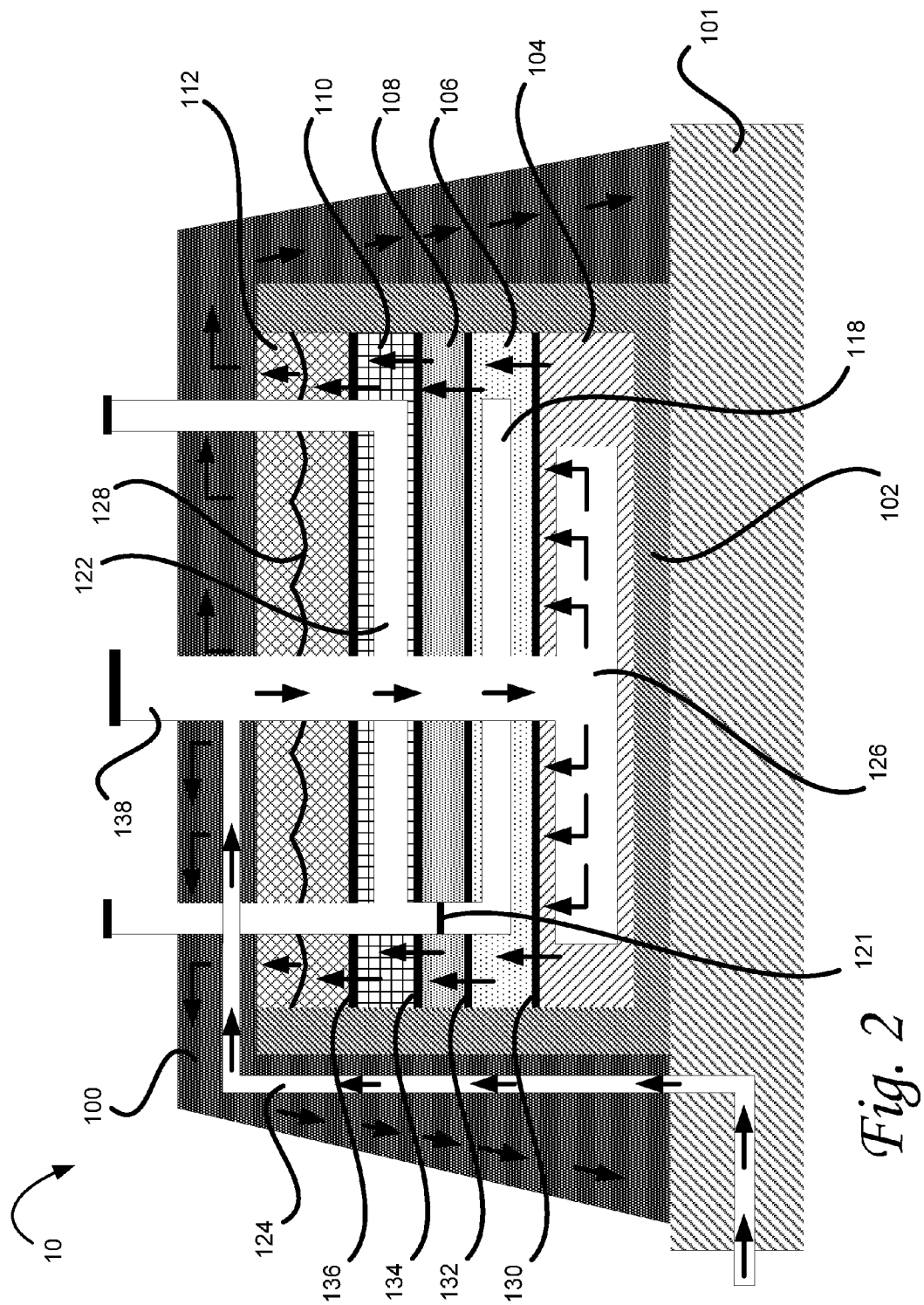
FIG. 2 is a schematic drawing illustrating an operation of the biological wastewater treatment system of the present invention when all layers are unclogged.
Figure 3:
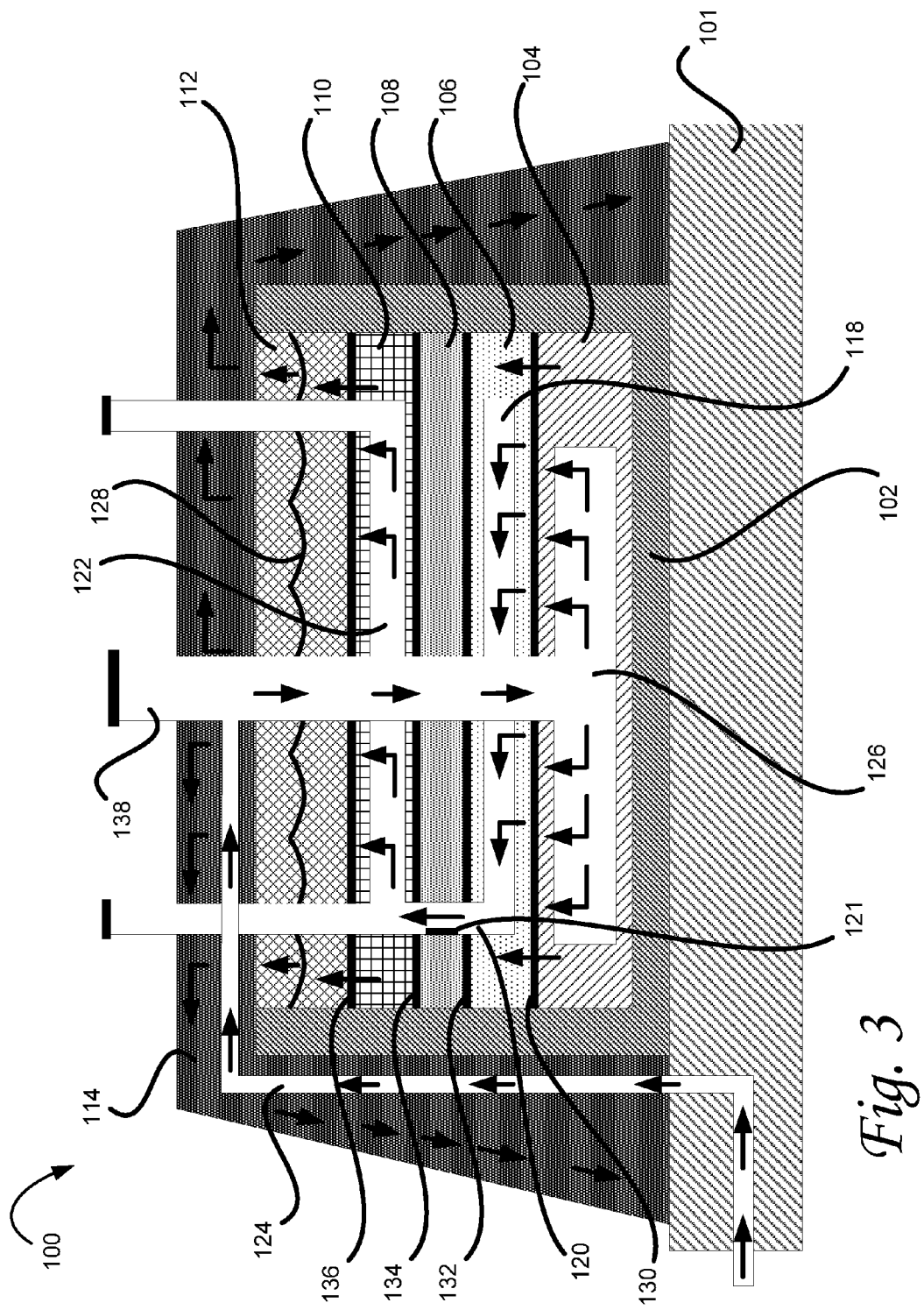
FIG. 3 is a schematic drawing illustrating an operation of the biological wastewater treatment system of the present invention when the third layer is clogged.

Referring now to FIGS. 2 and 3, an operation of the system 100 of the present invention is illustrated under different conditions. In both figures, the flow of water into, through, and out of the system is represented by arrows. In both figures, water rises up to the level 128 because of the water pressure of the input water. From the water level 128 upward, water rises by capillary action. This is a preferred, but optional, example. The inventor has found that by increasing the pressure of the input water and force feeding the system with input water, the level 128 can be raised to the upper edge of the basin and capillary action can be eliminated, if so desired.

FIG. 2 is a schematic drawing illustrating an operation of the biological wastewater treatment system 100 of the present invention when all layers are unclogged.

In operation, water at a desired pressure flows in the input pipe 124 and reaches the perforated exit pipe 126, option by passing via the standpipe 138 (if present). Water then flows out of the perforated exit pipe 126 and enters the first layer, where bacteria are grown and anaerobically treat the water. Water rises and crosses the layers 104, 106, 108, 110, and 112 up to the water level 128. As explained above, as water passes through these layers and contaminants are treated by bacteria, each layer retains a portion of biological contaminants (in the form of floc). In this path, the water is treated via anaerobic bacterial digestion, since the amount of free oxygen molecules is too low. It should be noted that if aerobic treatment is desired, an aeration system can be used to introduce air into the layers, so as to enable aerobic digestion.

Water then rises from the fifth layer 112 to the final layer 114 by capillary action, and is further decontaminated by passage via the final layer 114. Above the water level 128 and throughout the final layer 114, air is available and the water is treated via aerobic bacterial digestion. While in the final layer, gravity acts on the water and causes the water to descend to from the sides of final layer toward the peripheral edge portion 116 and into the native soil.

Throughout the operation of the system 100, the plug 121 is kept closed, in order to force the water to traverse all layers.

FIG. 3 is a schematic drawing illustrating an operation of the biological wastewater treatment system of the present invention when the third layer is clogged.

The inventor has found that after a certain amount of time (varying, for example, between 5 to 15 years), enough floc has been produced in the system to clog the third layer 108. The present invention provides a technique for bypassing the third layer, enabling the use of the system 100 for a longer period of time.

In FIG. 3, the treatment process remains the same until the water reaches the second layer 106. The plug 121 is opened. Because the third layer 108 is clogged, no water may pass therethrough. Water in the second layer thus enters the first perforated pipe 118, and reaches the second perforated pipe 122 via the connection pipe 120. Water then exits the second perforated pipe and enters the fourth layer 110. The subsequent path of the water flow to the fifth layer 112, the final layer 114, and the native soil 101 is as described above in the description of FIG. 3.

Bypassing the third layer allows extended use of the system 100. The inventor has found that most commonly the use can be extended by 5 to 15 years. Moreover, the inventor has found that even though the water is treated in fewer layers when the bypass is performed, the amount contaminants in water that exits the system 100 and enters the native soil is about the same as the amount of contaminants found in water that has passes through all the layers.

Figure 4:
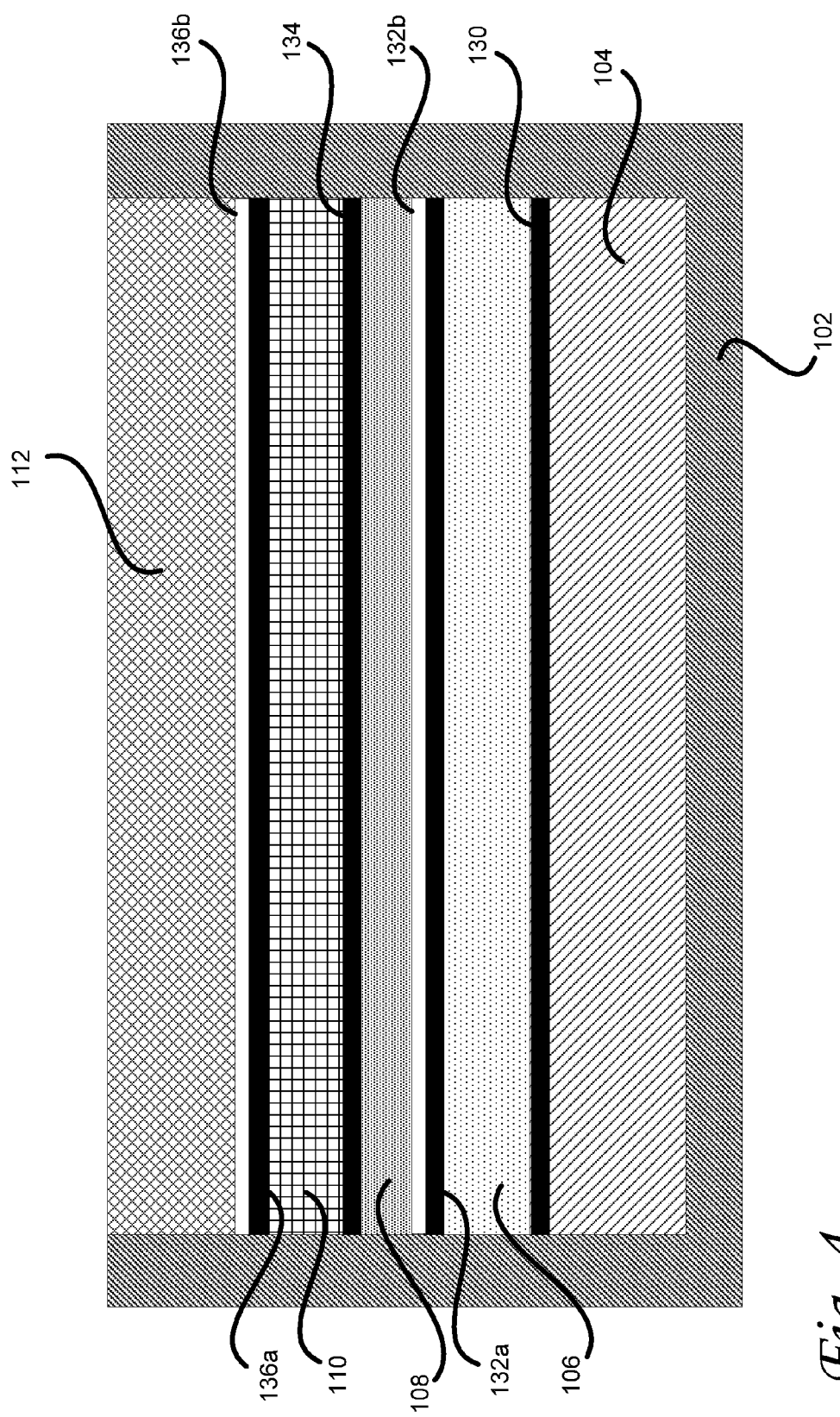
FIG. 4 is a schematic drawing illustrating an example of the separation between layers in the basin.

Reference is now made to FIG. 4, which is a schematic drawing illustrating an example of the separation between layers in the basin.

As mentioned above, the layers in the basin are separated by partitions. The choice of the partitions depends on the properties of the layers.

In some embodiments of the present invention, because the second layer 106 is made of coarse material, the first partition 130 between the first layer 104 and the second layer 106 is coarse. Thus the partition may have a net-like structure having relatively large openings. Optionally, the partition 130 is a rigid partition, configured for supporting the second layer, as the size of the coarse material of the second layer is relatively large. The partition 130 may be, for example, a window screen. The third partition 134 between the third layer 108 and the fourth layer 110 has the same properties as the first partition 130, as the third partition is designed to prevent a coarse material in the fourth layer from falling into the third layer. The window screen used may be, for example an 18 by 16 mesh screen, where the diameter of the threads is about 0.11 inches.

The second partition 132 is configured for preventing the passage of granular material from the third layer 108 to the coarser second layer 106, while allowing the passage of water. The fourth partition 136 is designed to prevent a fine material in the fifth layer from falling into the coarser fourth layer. Thus the fourth partition 136 between the fourth layer 110 and the fifth layer 112 has the same properties as the second partition.

In a variant, the second partition 132 may include a second fine partition 132b and a second coarse partition 132a. The second fine partition 132b is a grid that has small openings which prevent the passage of granular material. The fine partition may be flexible, and if left unsupported may sag into the second layer 106. Thus, a rigid coarse partition 132a may be used to support the fine partition, in order to clearly define the separation between the second layer and the third layer. The second rigid partition 132a may include a rigid 18 by 16 mesh screen. The second fine partition 132b may include a bridal veil, for example made of Illusion fabric and/or nylon.

In another variant, the second partition 132 (and the fourth partition 136) is a single rigid partition with small openings which prevent the passage of granular material. A non-limiting example of a rigid partition with small openings is a 20 by 20 wire mesh.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A biological wastewater treatment system comprising:
   (a) a watertight basin having an open top and configured for being placed on a substrate;
   (b) a filter located in the basin, the filter comprising:
      (b1) a first layer at the bottom of the basin, the first layer comprising a plurality of first coarse pieces of a first material having a predetermined surface, configured for enabling growth of bacteria;
      (b2) a second layer mounted above the first layer and comprising a plurality of second coarse pieces of a second material, the second pieces being smaller than the first pieces;
      (b3) a third layer mounted above the second layer and comprising a first granular material;
      (b4) a fourth layer mounted above the third layer and comprising a plurality of third coarse pieces of third material, the third pieces being smaller than the first pieces; and
      (b5) a fifth layer mounted above the fourth layer and comprising a second granular material;
   (c) a final layer mounted above the fifth layer, extending upward above the basin and extending laterally outward from the basin and downward toward the substrate, such that a section of the final layer contacts the substrate, the final layer comprising a third granular material which is finer than the first granular material and second granular material;
   (d) an exit pipe having exit perforations located in the first layer, the exit pipe being configured for receiving water from an input pipe and for enabling discharge of water into the first layer via the perforations;
   (e) a first perforated pipe having first perforations located in the second layer, and configured for receiving water from the second layer via the first perforations;
   (f) a second perforated pipe having second perforations located in the fourth layer and configured for enabling discharge of water from the fourth layer via the second perforations; and
   (g) a connection pipe in fluid communication with the first perforated pipe and second perforated pipe, and enabling passage of water from the first connection pipe to the second connection pipe, for bypassing the third layer.

2. The system of claim 1, further comprising a plug located in the connection pipe, the plug having a closed mode and an open mode, wherein the plug is configured for enabling passage of water from the first perforated pipe to the second perforated pipe in the open mode and for preventing passage of water from the first perforated pipe to the second perforated pipe in the closed mode.

3. The system of claim 1, wherein the first coarse pieces are tubes, each tube being open at both ends of the tube.

4. The system of claim 3, wherein each tube has a length of 0.5 inches and an outer radius of 0.5 inches.

5. The system of claim 1, wherein the first material is plastic.

6. The system of claim 1, wherein the second coarse pieces of material and the third coarse pieces have substantially equal size.

7. The system of claim 1, wherein the second material is the same as the third material.

8. The system of claim 1, wherein at least one of the second material and third material is plastic.

9. The system of claim 1, wherein the second coarse pieces and/or third coarse pieces are tubes, each tube being open at both ends of the tube.

10. The system of claim 9, wherein the tubes have an outer diameter of 0.25 inches and a length of 0.25 inches.

11. The system of claim 1, wherein the second pieces and/or the third pieces comprise gravel particles.

12. The system of claim 1, wherein the first granular material is the same as the second granular material.

13. The system of claim 1, wherein the first granular material and/or the second granular material comprises washed builder's sand.

14. The system of claim 1, further comprising a first partition between the first layer and the second layer, the first partition having a net-like structure and being configured for preventing the second pieces from falling into the first layer while enabling passage of water between the first layer and the second layer.

15. The system of claim 1, further comprising at least one of a second partition between the second layer and the third layer and a fourth partition between the fourth layer and the fifth layer, wherein:
   the second partition has a net-like structure and is configured for preventing the first granular material from falling into the second layer while enabling passage of water between the second layer and the third layer; and
   the fourth partition has a net-like structure and is configured for preventing the second granular material from falling into the fourth layer while enabling passage of water between the fourth layer and the fifth layer.

16. The system of claim 15, wherein the second partition comprises a second fine partition and a second coarse partition, wherein:
   the second fine partition is a flexible grid having fine apertures having a size suitable from preventing the first granular material from falling into the second layer while enabling passage of water between the second layer and the third layer; and
   the second coarse partition is a rigid grid having coarse apertures larger than the fine apertures, the second coarse partition being located below the second fine partition and being configured for supporting the second fine partition and preventing the second fine partition from sagging into the second layer.

17. The system of claim 15, wherein the third partition comprises a third fine partition and a third coarse partition, wherein:
   the third fine partition is a flexible grid having fine apertures having a size suitable from preventing the second granular material from falling into the fourth layer while enabling passage of water between the fourth layer and the fifth layer; and
   the third coarse partition is a rigid grid having coarse apertures larger than the fine apertures, the third coarse partition being located below the third fine partition and being configured for supporting the third fine partition and preventing the third fine partition from sagging into the fourth layer.

18. The system of claim 1, further comprising a fourth partition between the third layer and the fourth layer, the fourth partition having a net-like structure and being configured for preventing the third pieces from falling into the third layer while enabling passage of water between the third layer and the fourth layer.

19. The system of claim 1, comprising a standpipe configured for receiving the water from the input pipe and directing the water to the exit pipe, the standpipe protruding out of the final layer.

20. The system of claim 1, comprising at least one of:
- a first inspection pipe joined to the connection pipe and protruding out of the final layer; and
- a second inspection pipe joined to the second perforated pipe and protruding out of the final layer.

* * * * *